United States Patent Office 3,450,433
Patented June 17, 1969

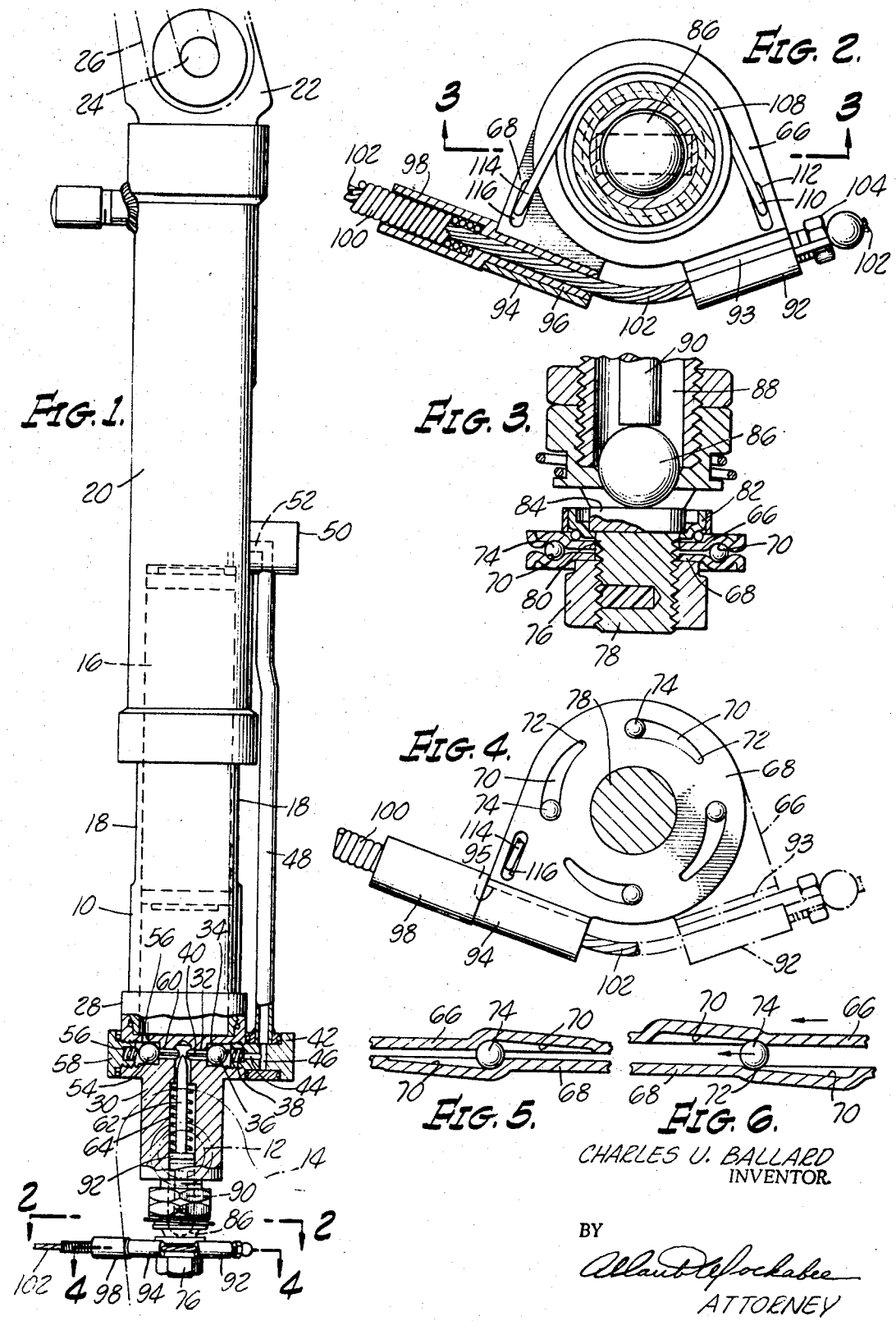

3,450,433
CAM ACTUATED CLUTCH
Charles U. Ballard, 4253 W. Lennox,
Inglewood, Calif. 90304
Filed July 27, 1967, Ser. No. 656,476
Int. Cl. A47c 1/02, 3/00
U.S. Cl. 297—355                         1 Claim

ABSTRACT OF THE DISCLOSURE

A cam operated valve operator for a closed circuit including a cylinder and piston wherein the cylinder and piston respectively have means for connection with a relatively stationary seat and a relatively movable tiltable back, or for devices having similar movement, the fluid circuit having a valve which when closed, locks the piston in the cylinder and the seat relative to the back, the valve being actuated by a cam device comprising adjacent discs, one of which is rotatable relative to the other, one of which has arcuate grooves of diminishing depth to receive balls, which upon rotation of one of the cam discs, will move one disc axially to operate the valve.

---

The invention relates to a cam actuated operator for a valve in a hydraulic circuit including a piston and cylinder unit, and while adaptable to other purposes, is particularly effective in locking the adjustable back of a seat, such as an aircraft seat, in different tilted positions relative to the stationary seat body.

Conventionally, airplane seat locks include hydraulic piston and cylinder units in a hydraulic circuit and a valve in said circuit which is operated in some suitable manner to open the valve and permit movement of the piston and the seat back and to close the valve to lock the piston and seat back in a desired angular position of the seat back.

Generally it is an object of the invention to provide an actuator for the operator of such a valve based upon a camming principle in which rotary camming motion is translated in rectilinear valve actuating motion.

More specifically it is an object to provide a cam type valve operator which includes a pair of cam discs, at least one of which has preferably a plurality of arcuate slots of diminishing depth with a ball in each slot, the ball engaging the face of the other cam disc, wherein one of the cam discs is movable axially, and wherein rotation of one of the discs will cause the balls to roll in the cam grooves of diminishing depth and shift the axially movable disc to operate the hydraulic control valve.

The above and other objects of the invention will more fully appear from the following description in connection with the accompanying drawing:

FIG. 1 is a view partially in side elevation and partially in section of an embodiment of the invention showing portions of a seat structure in broken lines;

FIG. 2 is an enlarged sectional view taken approximately on the line 2—2 of FIG. 1;

FIG. 3 is a sectional detail taken approximately on the line 3—3 of FIG. 2;

FIG. 4 is an enlarged sectional view taken approximately on the line 4—4 of FIG. 1;

FIG. 5 is an enlarged sectional detail of portions of the cooperating cam plates in the position they assume when the hydraulic valve is closed;

FIG. 6 is a view similar to FIG. 5 with the cam plates moved to the position they assume when the hydraulic valve is open.

The drawing shows a cylinder 10 suitably connected by a pivot pin 12 to a bracket 14, the latter being one of a pair at the rear corner portions of a seat, such as an aircraft seat. In the cylinder is a piston 16 connected by any suitable means through slots 18 in intermediate portions of the cylinder to a sleeve 20 which moves with said piston. The sleeve 20 has a lug 22 connected by a pivot pin 24 to a bracket 26 which may be suitably secured to a tilting seat back, such as found in passenger aircraft, so that the back, when tilted, will move the piston 16 and sleeve 20 relative to the cylinder 10. The details of the piston and cylinder unit are not shown herein since the invention relates to a cam actuated clutch for operating the fluid valve and the particular piston and cylinder arrangement are of no importance.

The lower end of the cylinder 10 is closed by a head 28 having a downward extension 30 to which the seat pivot 12 is secured. In the head 30 is a port 32 having an enlarged portion 34 to receive a ball valve 36 urged inwardly to a port-closing position by a spring 38. A valve opening pin 40 lies in the port 32, and when it is moved to the right, it will unseat the ball 36. The enlarged port portion 34 is closed by a plug 42 threaded into said enlarged portion. The plug 42 is provided with ports 44, 46 at right angles to each other and the port 46 communicates with a tube 48 leading to a plug 50 having an angular conduit 52 to provide flow communication to the upper side of the piston 16.

Port 32 at its left side, as viewed in FIG. 1, is provided with a ball valve 54 which is adapted to open and close a port 56 leading to the interior of the cylinder 10 below the lower end of the piston 16. Ball valve 54 is held in place by a spring 56 located in a threaded plug 58 mounted in the cylinder head 30. An actuator for the ball valve 54 is shown in the form of a stem 40 associated with the ball valve 36.

Stems 40 and 60 are slightly separated at their adjacent ends and adapted to be moved apart and against the balls 36 and 54 by a valve actuator 62 in the form of a stem slidable in the valve head 30 and biased by a spring 64 to the downward position shown in FIG. 1 which permits the ball valves 36 and 64 to seat, thus closing flow communication from the lower side of the piston 16 through the tube 48 to its upper side.

FIGS. 2 through 6 illustrate an actuator for the valve operator 62. There is illustrated a pair of discs 66 and 68. Each of said discs is shown provided with a plurality of arcuate grooves 70 of diminishing depth, the shallowest portions of the grooves being at the ends 72. A ball 74 is located partially in each of a complementary pair of grooves 70 in discs 66 and 68 respectively. In FIG. 5 the ball is shown at the deepest portion of each of a pair of cooperating grooves which results in discs 66 and 68 being more closely positioned. In FIG. 6 the ball 74 is shown in the shallower ends of the grooves 70 so that the discs are a greater distance apart.

The disc 68 is shown in FIG. 3 to rest upon a nut 76 threaded on the lower end 78 of an extension of the lower piston head 30. The disc 66 is upwardly slidable on a cylindrical portion 80 of the plug 78 to provide for the separation of the discs, indicated in FIGS. 5 and 6. Resting upon the upper disc 66 is a cupped flange 82 which supports a wafer 84 which in turn supports a ball 86 in the lower end of a bore 88 in the lower portion of the piston head 30. Resting upon the ball 88 is a pin 90 which bears against a plug 92 on the lower end of the valve operator stem 62.

When the lower cam disc 68 is partially rotated from the position of FIG. 5 to that of FIG. 6, the upper cam disc 66 is pushed upwardly, raising the cupped flange 82, wafer 84, ball 86, pin 90, head 92 and valve stem operator 62, causing the upper end of the stem 62 to wedge between the oppositely disposed stems 40 and 60 to unseat the ball valve 36 and 54. When said ball valves are unseated, the seat back can be tilted so that its bracket 26 will move toward or away from the seat base bracket 14 and change the position of the piston 16 in the cylinder 10. Then when the lower cam bracket 68 is returned to the position of FIG. 5, the upper cam bracket 66 and the elements interposed between it and the valve operating stem 62, will drop under the influence of the spring 64 and permit the ball valves 36 and 54 to close, thus blocking the closed fluid circuit from the lower side of the piston 16 to its upper side, and thereby locking the seat base bracket 14 and the seat back bracket 26 against relative movement to hold the seat back in a desired adjusted position of angularity.

The cam discs 66 and 68 are provided with sleeve-like anchors 92 and 94 respectively. In the sleeve-like element 94 is a tube cable guide 96 having an enlarged outer extension 98 to receive a helical cable guide sheath 100. A valve operating cable 102 extends from a point, preferably in the arm of an aircraft seat, through the guide sheath 100 and the guide sleeve 96, 98. The cable 102 extends through the guide sleeve 96 and through the sleeve-like element 92 on the cam plate 66 into which is threaded a headed sleeve 104 which serves as a stop for a lead ball 106 cast on the end of the cable 102.

The sleeve-like anchors 92 and 94 are provided with longitudinal slots 93 and 95 to permit the cable 102 to be inserted in the anchors quickly and conveniently.

Extending about a lower portion of the lower cylinder head 30 is a wire spring 108 having one end 110 extending through and anchored in a slot 112 in said disc 66. The other end 114 of the spring 108 extends through and is bent over a portion of the cam disc 68 through a slot 116. The spring 108 is so formed that its ends 110 and 114 are biased away from each other to hold the sleeve-like elements 92 and 94 apart and to yieldably maintain the cam discs in the position of FIG. 5, but which permit the discs to assume the position of FIG. 6 when the cable 102 is pulled to the right, as viewed in FIGS. 2 and 4.

The other end of the cable 102, which is not illustrated, and which was referred to as terminating in the arm of the aircraft seat, can be provided with any suitable type of actuator which may be in the form of a button or a lever so arranged that the cable 102 will be pulled to the left as stated to release the ball valves 36 and 54 for adjustment of the seat.

It should be noted that the piston and cylinder unit can be provided with suitable means well known in the art for returning the piston 16 in the cylinder 10, so that when the ball valves 36 and 54 are opened, the seat back will assume a vertical position when the occupant relieves it of pressure from his back. Likewise, when the valves 36 and 54 are opened, the seat can be tilted backwardly by backward pressure of the occupant against the bias of the above mentioned piston return means.

It should be understood that various changes can be made in the form, details, arrangement and proportions of the various parts without departing from the spirit of the invention.

I claim:
1. A cam actuated valve operator for a closed fluid circuit including a series connected cylinder and piston unit and a movable valve in said circuit, the cylinder having a connector for one of a pair of relatively movable parts and the piston having a connector for the other of said relatively movable parts, wherein the improvement comprises: a support, a pair of facing elements on said support, one being stationary relative to the other and one being rotatable relative to the other, one of said elements being movable relative to said support to move said valve, and said elements including cam means operable to separate the elements upon rotative movement of the relative rotatable element, said facing elements being of substantially identical construction with a side of each facing a side of the other and having a common central axis, each said side having a plurality of arcuate grooves of diminishing depth, each groove of one side being disposed opposite a groove of the other side and at an opposite depth inclination and having a ball therein, and at least one of said facing elements having an operating member receiver thereon.

References Cited

UNITED STATES PATENTS

| | | | |
|---|---|---|---|
| 2,581,197 | 1/1952 | McFadden | 297—359 |
| 2,653,648 | 9/1953 | Marshall | 297—361 X |
| 2,672,917 | 3/1954 | Collura | 297—327 |
| 2,884,047 | 4/1959 | Abbott | 297—353 X |
| 3,024,067 | 3/1962 | Brandoli | 297—355 |
| 3,025,108 | 3/1962 | Taegue | 297—327 |
| 3,150,898 | 9/1964 | Knudson | 297—361 X |

BOBBY R. GAY, *Primary Examiner.*

G. O. FINCH, *Assistant Examiner.*

U.S. Cl. X.R.

297—327